W. DAIGH.
IMPLEMENT FRAME.
APPLICATION FILED SEPT. 1, 1916.
1,244,838.
Patented Oct. 30, 1917.
3 SHEETS—SHEET 1.
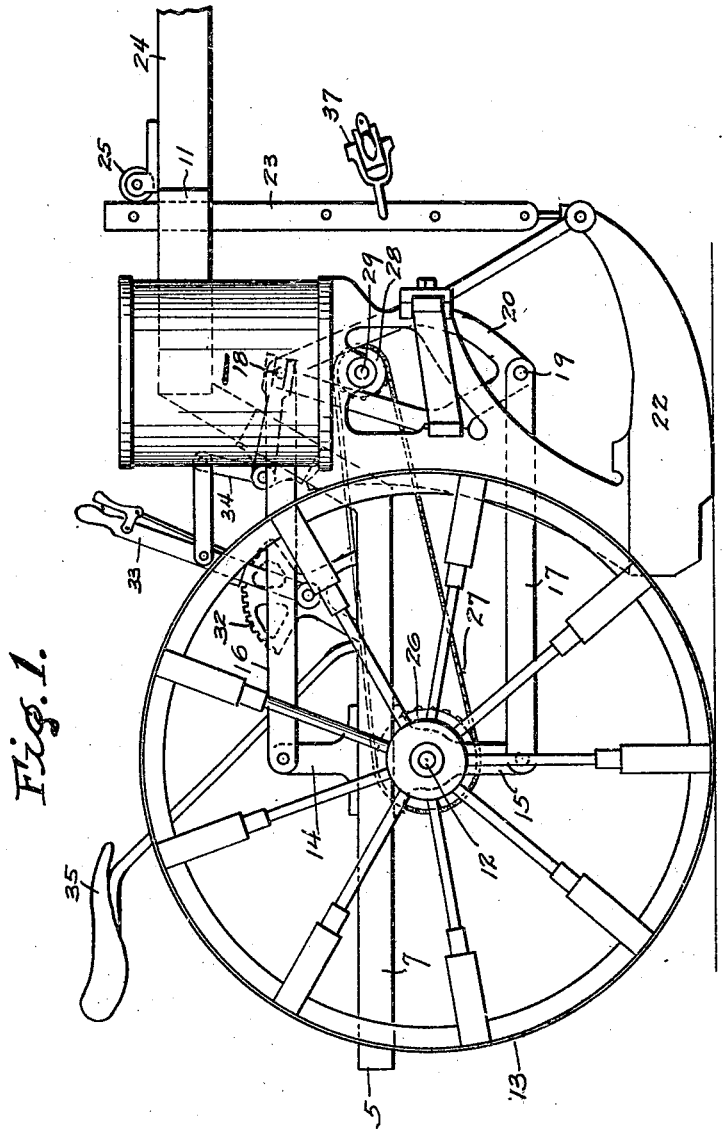
INVENTOR
Walter Daigh,
BY James A Walsh
ATTORNEY

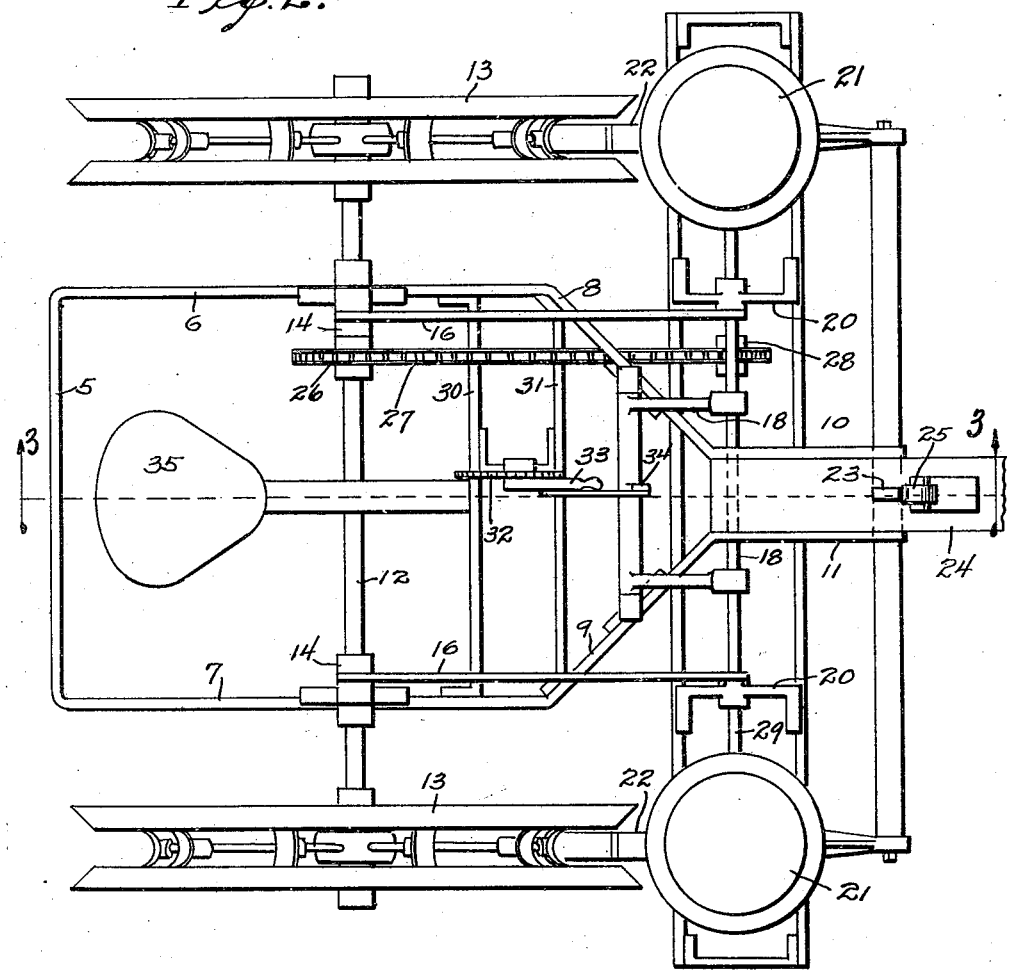

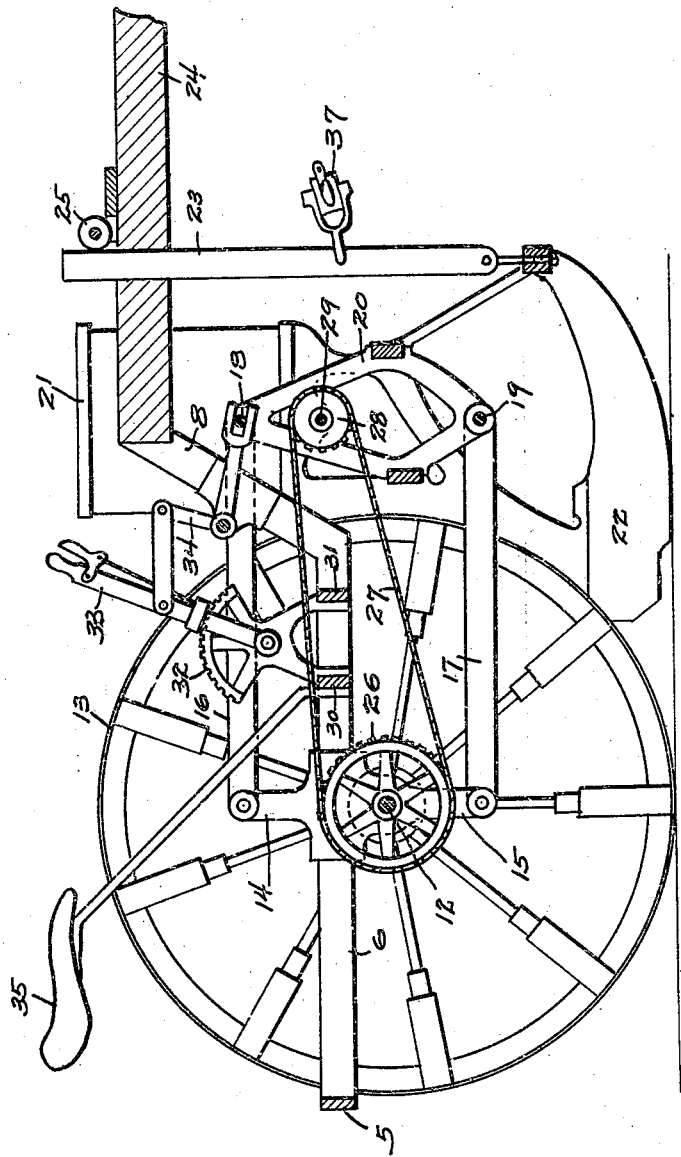

UNITED STATES PATENT OFFICE.

WALTER DAIGH, OF PARSONS, KANSAS, ASSIGNOR OF ONE-FOURTH TO CHARLES R. DAIGH, OF PARSONS, KANSAS.

IMPLEMENT-FRAME.

1,244,838.　　　　Specification of Letters Patent.　　Patented Oct. 30, 1917.

Application filed September 1, 1916.　Serial No. 118,143.

*To all whom it may concern:*

Be it known that I, WALTER DAIGH, a citizen of the United States, residing at Parsons, in the county of Labette and State of Kansas, have invented certain new and useful Improvements in Implement-Frames, of which the following is a specification.

My present invention relates to corn or seed planters, and particularly to the construction and arrangement of the frames thereof, which are so associated that the draft will be entirely on the main frame, and the auxiliary frame carrying the seed boxes, droppers, etc., not subjected to such draft but capable of being readily adjusted in a simple manner, whereby I produce an implement of the character indicated, which will be at all times positive and efficient in its action, and insure that the corn and seeds will be uniformly covered by the earth regardless of the irregularities of the soil or the varying movement of the implement when the animals are not pulling in unison.

In the accompanying drawings, forming part hereof, Figure 1 is a side elevation of my improved planter; Fig. 2 a plan thereof, and Fig. 3 is a longitudinal sectional view thereof, taken on the dotted line 3—3 in Fig. 2.

In said drawings, the main frame of the planter and the auxiliary frame for supporting the seed boxes, droppers and runners, to which my improvements especially relate, will be more especially referred to, while other details of construction and arrangements of parts forming no part of said improvements will be but incidentally referred to in describing the invention. My improved main frame comprises the cross bar 5, from which extend the parallel side bars 6, 7, which preferably converge upwardly, as at 8, 9, and terminate in the parallel members 10, 11. An axle, 12, of any suitable construction, is mounted on said frame and carries the covering wheels, 13, which may be of any appropriate arrangement to insure that the droppers will deposit seeds closely to the wheel base. Upon said main frame, at opposite sides thereof, I mount two sets of supports, 14, 15, extending preferably above and below axle 12, and upon each set of which I provide a pair of swinging links, 16, 17, which extend forwardly and are connected to the upper and lower shafts, 18, 19, respectively, of the auxiliary frame, 20, which carries the seed boxes, 21, and runners, 22, said frame carrying a runner hitch, 23, which extends upwardly and slidably through tongue, 24, the latter being rigidly connected to the main frame between members 10, 11, thereof, the vertical movement of said hitch, 23, being assisted by a roller, as 25. Upon axle 12, I mount a sprocket, 26, which communicates by sprocket chain, 27, to sprocket, 28, on shaft, 29, of the auxiliary frame 20, for operating the seeding devices, as is common. Also mounted upon said main frame, preferably on the cross members, 30, 31, is a quadrant, 32, and lever, 33, controlled thereby, which latter connects by toggle, 34, with the upper shaft, 18 of the auxiliary frame 20, and upon said frame a suitable seat, 35, is provided for the operator.

In my improved planter, the main frame and tongue, being rigidly connected, insure that the draft on the implement will be steady and entirely on the main frame, and that it will follow the irregularities of the soil at all times, so that corn and seeds passing through the runners will always be deposited in the earth the required depth, whether the same is hilly or depressed. When it is desired to lift the runners from contact with the earth, it is but necessary for the operator to draw lever 33 rearwardly, which movement, through the toggle connection with auxiliary shaft 18, elevates this auxiliary frame structure and so maintains it without strain upon the animals, and it can thus be freely adjusted upwardly and downwardly as desired, in the simple manner shown, independently of the animals and of said main frame. In planters with which I am familiar, the draft directly communicates with the auxiliary frame, so that when it is desired to elevate such frame and thus lift the runners from contact with the earth, the weight of this structure must be to a considerable extent maintained by the animals, as the tongue, which is directly connected thereto, is lifted by such frame, but with my improved planter the movement of this frame, being entirely independent of the draft, is readily controlled without reference to the animals. By providing the hitch 23, in the manner shown, the auxiliary frame is held steadily in position, and a flexible hitch, as 37, may be utilized in addition to the tongue, as will be readily understood.

I claim as my invention:

1. In a planter, a main frame terminating in an upwardly converging forward end and forming a tongue support, a tongue mounted therein, an auxiliary frame in advance of said main frame, pivotal means connecting said frames, and means connected with said frames for adjusting said auxiliary frame independently of said main frame and tongue.

2. In a planter, a main frame having an upwardly converging forward end constituting a tongue support, a tongue mounted therein, an auxiliary frame in advance of said main frame, links connecting said frames, a vertical hitch connecting with said auxiliary frame and said tongue, and means connected with said frames for vertically adjusting said auxiliary frame and said hitch.

3. In a planter, a rigid main frame converging upwardly at its forward end and terminating in a tongue support, an axle supported thereby, carrying wheels mounted upon said axle, link supports carried by said frame, links extending forwardly from said supports, an auxiliary frame connected to the opposite end of said supports, and a lever mounted on said main frame and connected with said auxiliary frame for vertically adjusting the latter independently of said main frame.

4. In a planter, a main frame, a tongue connected directly therewith, an auxiliary frame in advance of said main frame, horizontally arranged links connecting said frames, and means connected with said frames for swinging said auxiliary frame in a substantially vertical direction.

5. In a planter, a main frame terminating in an upwardly convergent forward end, a tongue connected with said end, an auxiliary frame in advance of said main frame, upwardly and downwardly projecting link supports carried by said main frame, upper and lower shafts in said auxiliary frame, an upper and lower set of horizontally arranged links connecting said supports and shafts, and means associated with said frames for adjusting said auxiliary frame.

In testimony whereof I affix my signature in presence of two witnesses.

WALTER DAIGH.

Witnesses:
H. A. BRYANT,
R. G. BALL.